(12) United States Patent
Mullarkey et al.

(10) Patent No.: US 8,601,575 B2
(45) Date of Patent: Dec. 3, 2013

(54) STATISTICAL METHOD AND SYSTEM FOR NETWORK ANOMALY DETECTION

(75) Inventors: Peter Mullarkey, Austin, TX (US); Michael C. Johns, Cedar Park, TX (US)

(73) Assignee: CA, Inc., Islandia, NY (US)

( * ) Notice: Subject to any disclaimer, the term of this patent is extended or adjusted under 35 U.S.C. 154(b) by 1491 days.

(21) Appl. No.: 12/059,076

(22) Filed: Mar. 31, 2008

(65) Prior Publication Data

US 2008/0250497 A1    Oct. 9, 2008

Related U.S. Application Data

(60) Provisional application No. 60/903,307, filed on Mar. 30, 2007.

(51) Int. Cl.
*G06F 11/00* (2006.01)
*G06F 15/173* (2006.01)

(52) U.S. Cl.
USPC ........................................... 726/22; 709/224

(58) Field of Classification Search
USPC ............................................................ 726/22
See application file for complete search history.

(56) References Cited

U.S. PATENT DOCUMENTS

| 7,225,343 | B1 * | 5/2007 | Honig et al. | 713/194 |
|---|---|---|---|---|
| 7,295,831 | B2 * | 11/2007 | Coleman et al. | 455/410 |
| 7,523,016 | B1 * | 4/2009 | Surdulescu et al. | 702/185 |
| 2003/0065409 | A1 | 4/2003 | Raeth et al. | |
| 2005/0044406 | A1 * | 2/2005 | Stute | 713/201 |
| 2007/0005297 | A1 | 1/2007 | Beresniewicz et al. | |

OTHER PUBLICATIONS

European Extended Search Report, Application No. 08733022.1, 8 pages, Feb. 2, 2011.
Hood et al., "Proactive Network-Fault Detection," IEEE Transactions on Reliability, IEEE Service Center, vol. 46, No. 3, 9 pages, Sep. 1, 1997.
Manikopoulos, et al., "Network Intrusion and Fault Detection: A Statistical Anomaly Approach," IEEE Communications Magazine, IEEE Service Center, vol. 40, No. 10, 7 pages, Oct. 1, 2002.
Scarfone, et al., "Guide to Intrusion Detection and Prevention Systems (IDPS)," National Institute of Standards and Technology, U.S. Department of Commerce, 128 pages, Feb. 28, 2007.
Singapore Written Opinion, Application No. 200906541-8, 9 pages, Sep. 16, 2010.
European Communication pursuant to Article 94(3) epc; Application No. 08733022.1-2416; pp. 6, Dec. 28, 2011.
Patcha et al.; "An Overview of Anomoly Detection Techniques: Existing Solutions and Latest Technological Trends"; Computer Networks (2007); Pga. 25, 2007.
European Office Action; Application No. 08 733 022.1-2416; pp. 5, Aug. 1, 2012.

* cited by examiner

*Primary Examiner* — Nathan Flynn
*Assistant Examiner* — Abdullah Almamun
(74) *Attorney, Agent, or Firm* — Baker Botts L.L.P.

(57) ABSTRACT

An anomaly detection method and system determine network status by monitoring network activity. A statistics based profile for said network over a period is generated to analyze potentially anomalous network activity to determine if said network activity is anomalous by comparing current activity against the profile. Using the profile as a reference, the anomaly detection system and process estimate and prioritize potentially anomalous network activity based on the probability that the behavior is anomalous. The level of severity that the anomaly detection process uses to determine if an alarm is needed is based on comparing user-adjustable thresholds to the current probability. If the threshold has been breached, the user is alerted, subject to other quality checks. After a reporting cycle concludes, the anomaly detection system and process recompiles the statistics based profile to take into account the information observed in the previous reporting cycle.

19 Claims, 10 Drawing Sheets

*FIG. 2*
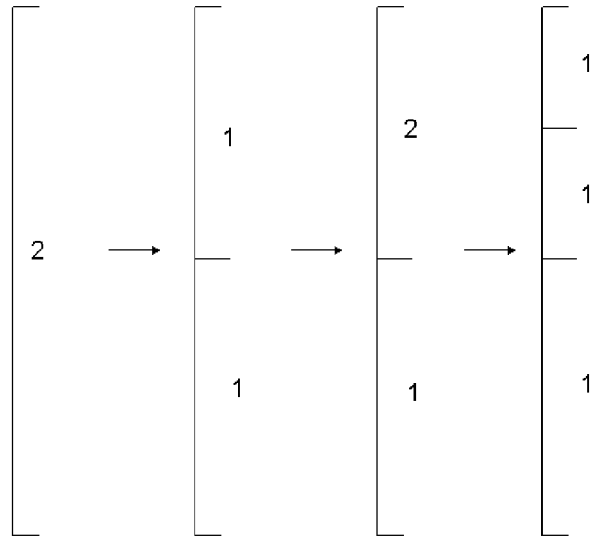
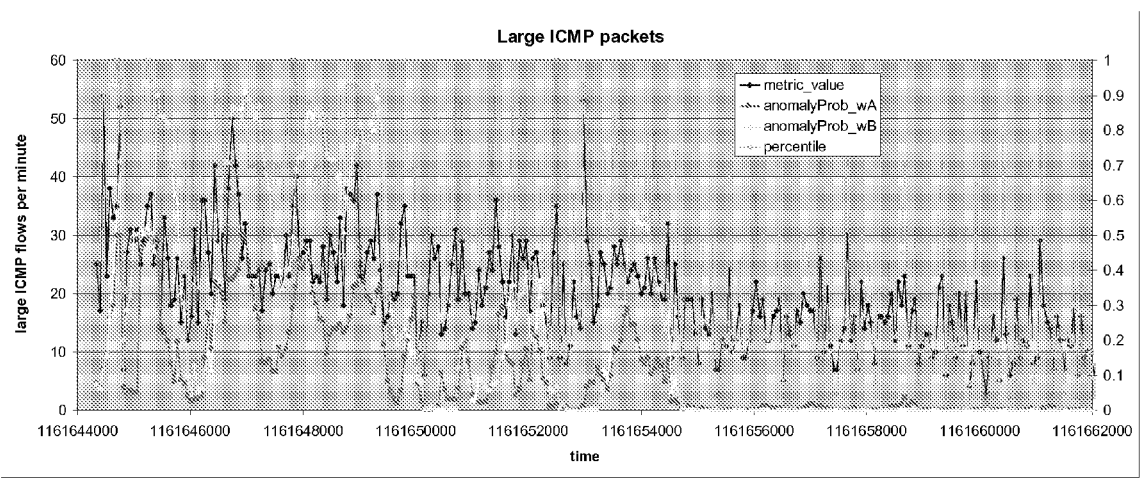
*FIG. 3*

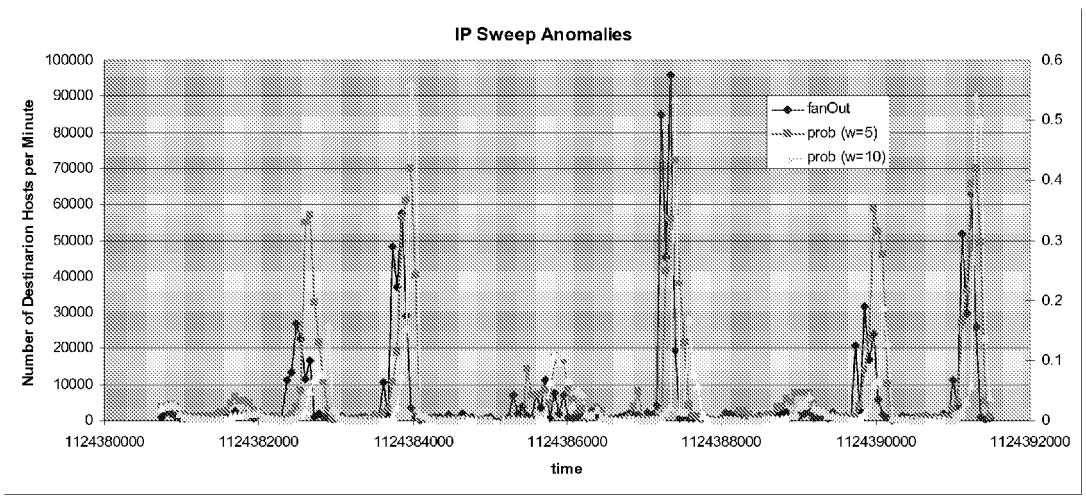
FIG. 4
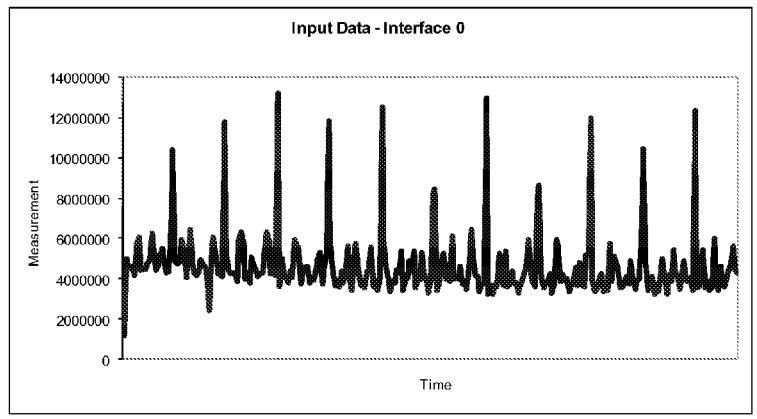
FIG. 5
FIG. 6
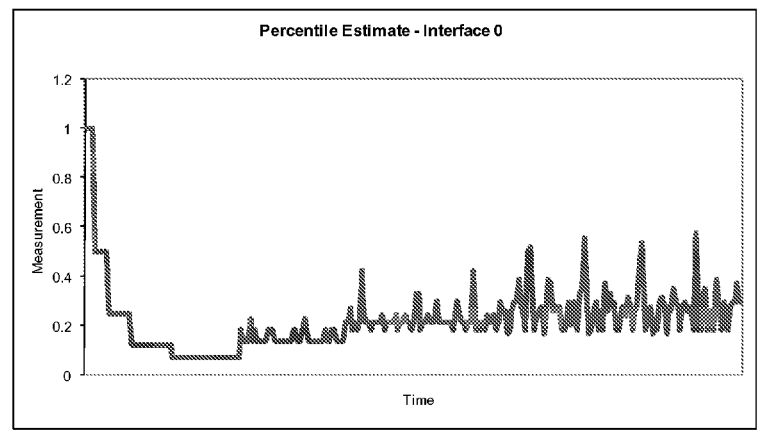

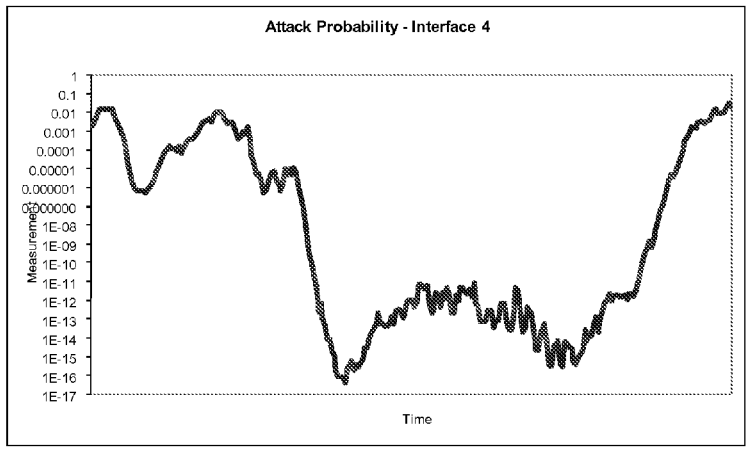
FIG. 19
FIG. 20
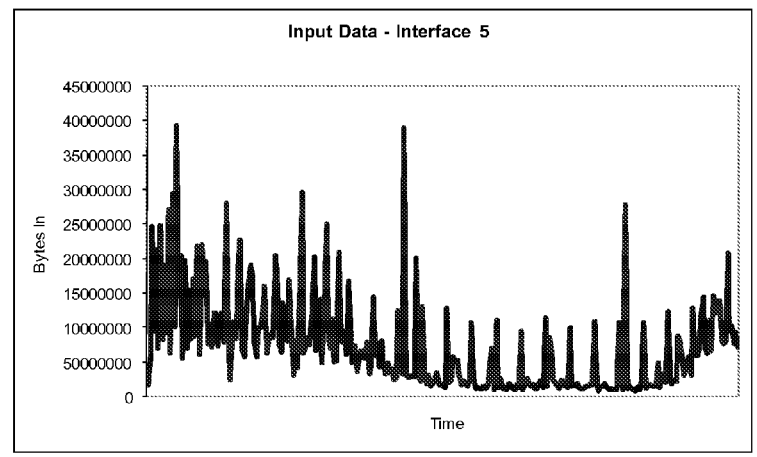
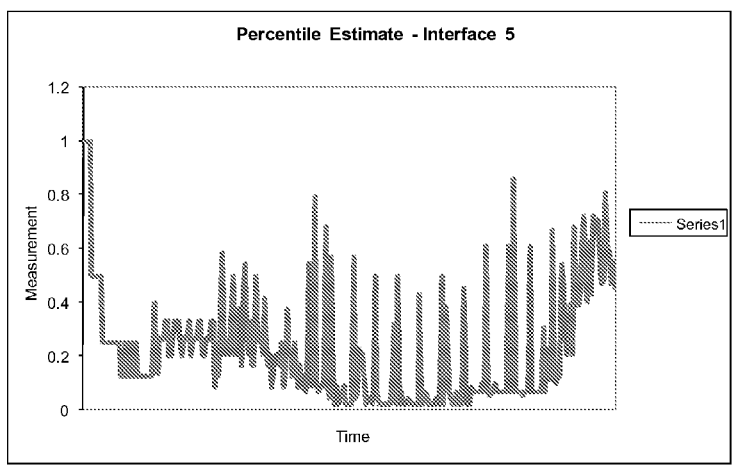
FIG. 21

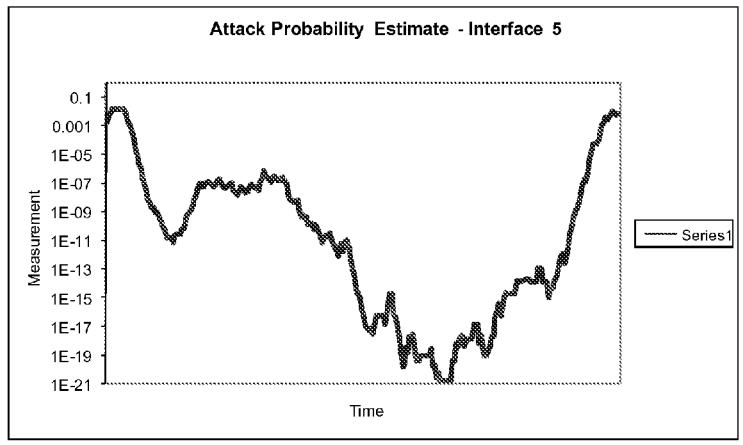
*FIG. 22*
*FIG. 23*
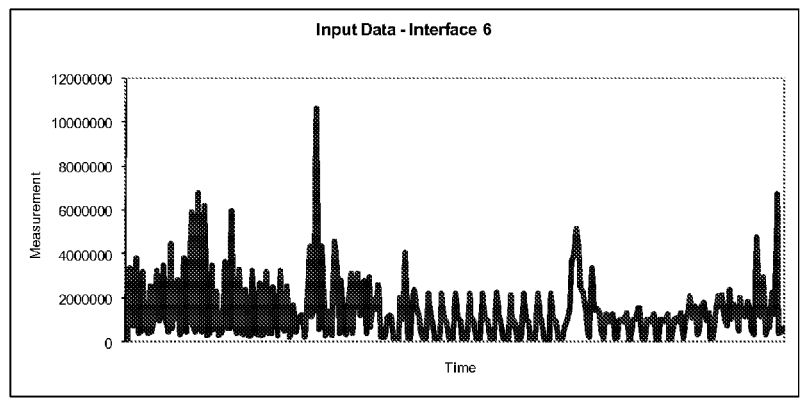
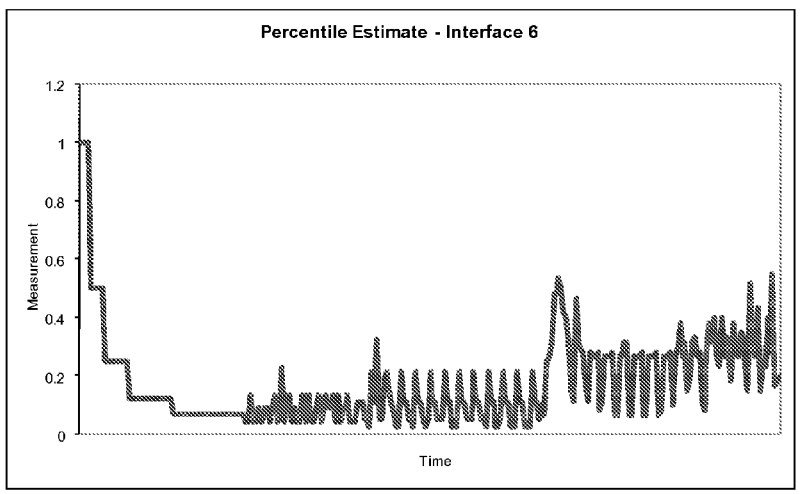
*FIG. 24*

STATISTICAL METHOD AND SYSTEM FOR NETWORK ANOMALY DETECTION

REFERENCE TO RELATED APPLICATION

This application claims the benefit of priority to U.S. Provisional Patent Application Ser. No. 60/909,307 entitled "Statistical Approach to Network Anomaly Detection," by Peter Mullarkey filed on Mar. 30, 2007, and is incorporated herein by reference in its entirety for all purposes.

TECHNICAL FIELD

The disclosed subject matter relates to the diagnostics and monitoring of network communication systems. Specifically, the disclosure teaches how to detect possible anomalies using a statistical profile of predicted network activity at a given moment.

BACKGROUND

Network diagnostic and monitoring tools are a common feature of modern communication systems. These tools monitor all aspects of networks, from the number of people accessing the network resources to possible attacks on the network. Network attacks are the most serious forms of network issue; therefore, more resources are dedicated to identifying them.

A common method of detecting attacks comes from intrusion detection systems ("IDS"). An IDS may detect an event based on a pre-defined criteria, but this requires the data containing the attack to pass through the IDS. Further, because the IDS must have a pre-defined criteria, identifying new variants of an attack are less likely to be detected by an IDS.

Another device used in networks is the data harvester. Data harvesters collect information about the network as the network operates. This information is typically used for reporting and may be used for forensic analysis of network issues after the fact. Unlike an IDS, which needs information specifically routed as part of the chain in the network, the data harvester typically looks at a larger portion of the entire network, since it is deployed to support normal network monitoring and planning.

The differences between an IDS and a data harvester may be shown by example. An IDS might be incapable of early warnings from an attack that does not pass though an IDS for the initial attack. The attack could be based on anything, from computer programs to external computers logging in. The IDS will eventually detect the attack, but an indeterminate amount of time could lapse until the attack comes into the IDS' limited field of view. Once the attack has been detected, the earlier activity of the attack may be forensically examined from the data harvester, but the data harvester is merely a post-attack resource and does not actually announce or identify an anomaly or attack-the data harvester only logs the activity to be later analyzed.

While the data harvester may typically see more of the network traffic than an IDS, there has not been a way to use effectively the information gathered by the data harvester in a prompt manner to alert someone of a potential attack or anomaly. This leaves a wealth of information unused for anomaly detection.

To use this currently untapped information in the data harvester, there is a need for a process that may evaluate the logged data as the data is logged and identify potential anomalies or attacks. Typical detection tools do not use preceding events to set dynamically threshold alert values. If the threshold level is set too low, more false alarms are triggered, consequently making each subsequent alarm seem less important. Conversely, if the thresholds are set too high, many potential anomalies or attacks will go unreported or will be reported too late for an effective response to be implemented.

Another threshold issue comes from network use over the course of a fixed time. Network usage typically is highest during the workday and lowest at non-work hours (nights and weekends). The same threshold level for all time results in over-reports during the workday and underreports during non-work hours. Even if these thresholds change as a function of the time of the day or week, the earlier issues of fixed thresholds still exist.

Another problem with IDS detection comes from their detailed analysis of data passing through them. An IDS typically looks at the full contents of the data, examining the data bit by bit. This allows for very detailed analysis, but is resource intensive. When attacks occur, they generally have attributes that may be detected without the need for such a detailed examination. Such attacks may be detected by taking a wider or broader view of the information rather than looking into the contents of each data packet. While the wider or broader view forms of detection may not detect the most sophisticated of attacks, such view enables rapidly detecting more common attacks before they impede the network.

Accordingly, there exists a need to use effectively the information collected by data harvesters. In order for this to occur, there needs to be a way to determine what is typical for a particular network and a way to determine if recently observed patterns are atypical.

SUMMARY

The method, system, and storage medium illustrated and described herein have several features, no single one of which is solely responsible for its desirable attributes. Without limiting the scope as expressed by the description that follows, its more prominent features will now be discussed briefly. After considering this discussion, and particularly after reading the section entitled "DETAILED DESCRIPTION OF THE ILLUSTRATIVE EMBODIMENTS" one will understand how the features of the disclosed process provide for the evaluation, identification, and reporting of network and other data anomalies while increasing accuracy and lowering false positive alarms.

According to one aspect of the disclosed subject matter, a method, system, and storage medium are provided to take a network wide approach to detect potentially anomalous activity on the network, evaluate the potentially anomalous activity against a threshold alert level that is dynamically adjusted based on the previously observed network activity over a pre-set time period taking into account a pre-set probability of an anomaly occurring (i.e., a threat level). The present disclosure uses statistical analysis to determine if current network data is consistent with anomalous behavior, and if the data is consistent, the user is alerted. To determine whether the current data is anomalous, the anomaly detection process creates a statistics based profile over a period against which to compare future data. Using the profile as a reference, the anomaly detection process dynamically estimates the probability that the network activity is anomalous. This probability is compared to a user-adjustable threshold value. If the threshold has been breached, and other quality checks are satisfied, the user is alerted. After a reporting cycle concludes, the disclosed process recompiles the statistics based profile to take into account the information observed in the previous reporting cycle.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features, and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTION OF DRAWINGS

The features, nature, and advantages of the disclosed subject matter may become more apparent from the detailed description set forth below when taken in conjunction with the drawings in which like reference characters identify correspondingly throughout and wherein:

FIG. 2 shows an exemplary process of the dynamic placeholders where placeholders dynamically adjust to maintain equivalent size;

FIG. 3 illustrates an example of how the disclosed method and system may display the results of a detector showing the raw metric value, the percentile differences, and two anomaly probabilities on a graph showing the number of large Internet Control Message Protocol packets as a function of time;

FIG. 4 demonstrates how the anomaly detection process may display the results of an IP FanOut detector on a graph showing the number of destination contacts per minute as a function of time;

FIG. 5 displays how the disclosed method and system may display the activity of network activity over a period of time;

FIG. 6 presents how the disclosed process may display a percentile estimate of anomalous activity over a period of time based on the activity noted in FIG. 5;

FIG. 19 points up how the disclosed process may display the probability of an attack on the network over a period of time based on the activity noted in FIG. 17;

FIG. 20 displays how the disclosed method and system may display the activity of network activity over a period of time;

FIG. 21 exhibits how the anomaly detection process may display the a percentile estimate of anomalous activity over a period of time based on the activity noted in FIG. 20;

FIG. 22 illustrates an example of how the anomaly detection process may display the probability of an attack on the network over a period of time based on the activity noted in FIG. 20;

FIG. 23 demonstrates how the disclosed process may display the activity of network activity over a period of time;

FIG. 24 displays how the disclosed process may display a percentile estimate of anomalous activity over a period of time based on the activity noted in FIG. 23;

DETAILED DESCRIPTION OF THE ILLUSTRATED EMBODIMENTS

Although described with particular reference to a systems environment, the claimed subject matter may be implemented in a plurality of information technology (IT) systems. Those with skill in the electronic telecommunications arts will recognize that the disclosed embodiments may be realized in ways in addition to those specific examples described below. In addition, the methods of the disclosed subject matter may be implemented using a variety of combinations of software and hardware. The hardware portion may be implemented using specialized logic; the software portion may be stored in a memory and executed by a suitable instruction execution system such as a microprocessor, PC, or mainframe.

Preferred embodiments of this disclosed subject matter are described herein, including the best mode known to the inventors for carrying out the disclosed subject matter. Variations of those preferred embodiments may become apparent to those of ordinary skill in the art upon reading the foregoing description.

A network computing system typically includes a variety of computer readable media. Computer readable media may be any available media that may be accessed by the computing system and includes both volatile and nonvolatile media and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computing system.

The present disclosure provides a process capable of determining network status by monitoring network activity. A statistics based profile for the network over a period would be generated to analyze potentially anomalous network activity to determine if the network activity is anomalous by comparing current activity against the profile. Using the profile as a reference, the process may estimate and prioritize the potentially anomalous network activity based on probability. The level of probability that the anomaly detection process would use to determine if an alarm is needed would be based on user-modifiable thresholds. If the threshold has been breached and other quality checks are satisfied, the user would be alerted. After a reporting cycle concludes, the disclosed process would recompile the statistics based profile and non-fixed thresholds to take into account the information observed in the previous reporting cycle.

Figure 1:
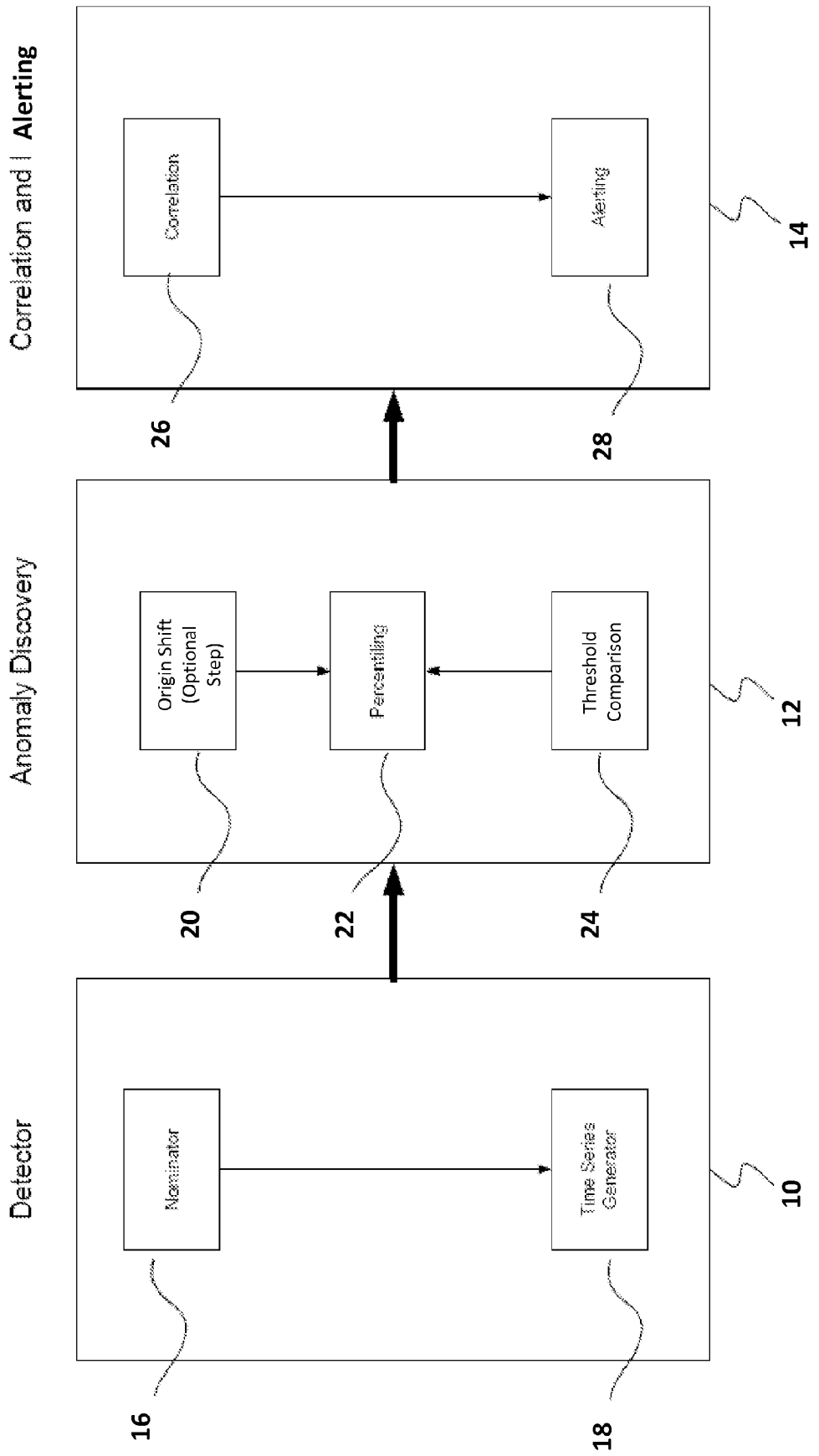
FIG. 1 represents a simplified block diagram of the anomaly detection process with the component steps of detection, anomaly discovery, correlation and alerting, with associated sub components.
Figure 7:
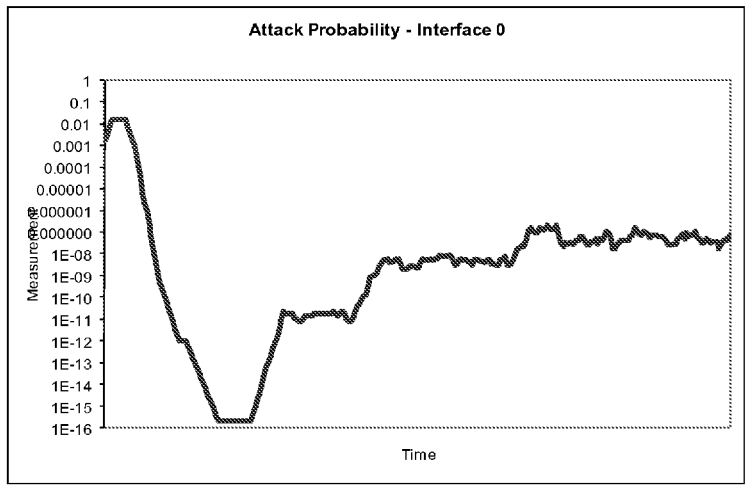
FIG. 7 points up an example of how the anomaly detection process may display the probability of an attack on the network over a period of time based on the activity noted in FIG. 5.
Figure 8:
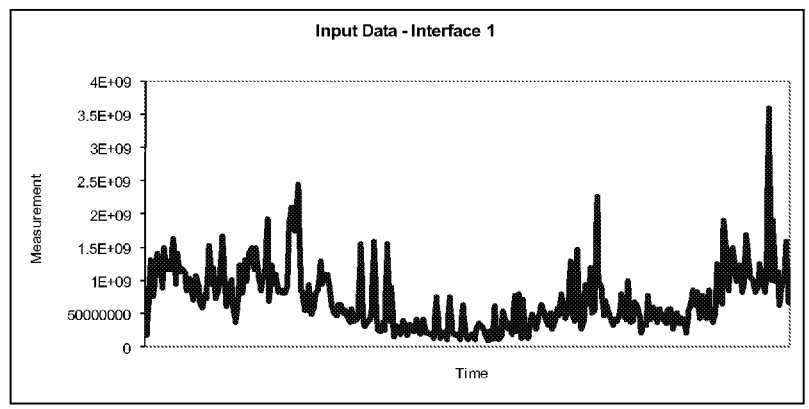
FIG. 8 displays how the disclosed method and system may display the activity of network activity over a period of time.
Figure 9:
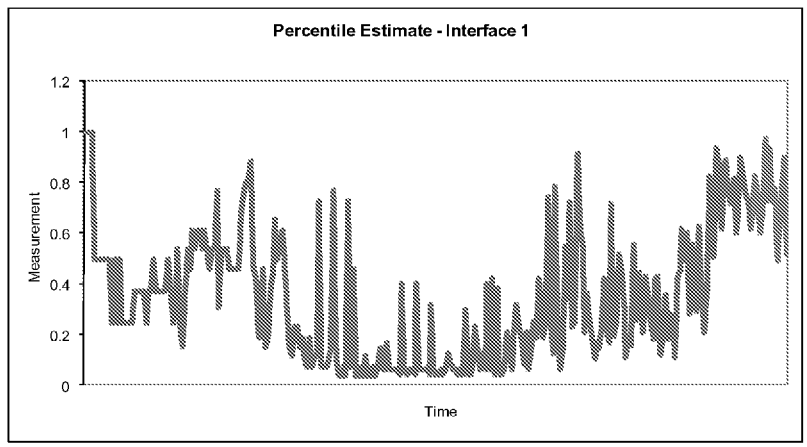
FIG. 9 exhibits how the disclosed process may display the a percentile estimate of anomalous activity over a period of time based on the activity noted in FIG. 8.
Figure 10:
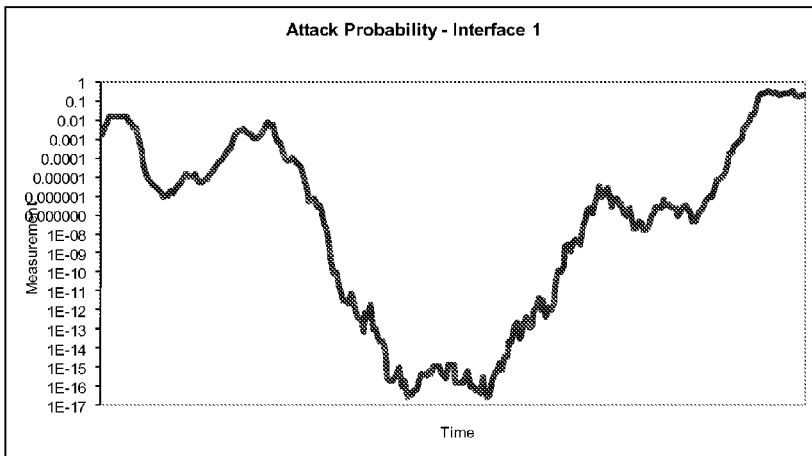
FIG. 10 expresses how the anomaly detection process may display the probability of an attack on the network over a period of time based on the activity noted in FIG. 8.
Figure 11:
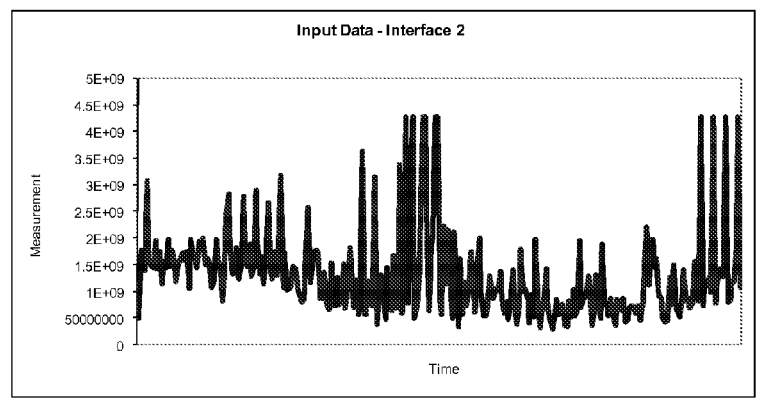
FIG. 11 illustrates how the disclosed process may display the activity of network activity over a period of time.
Figure 12:
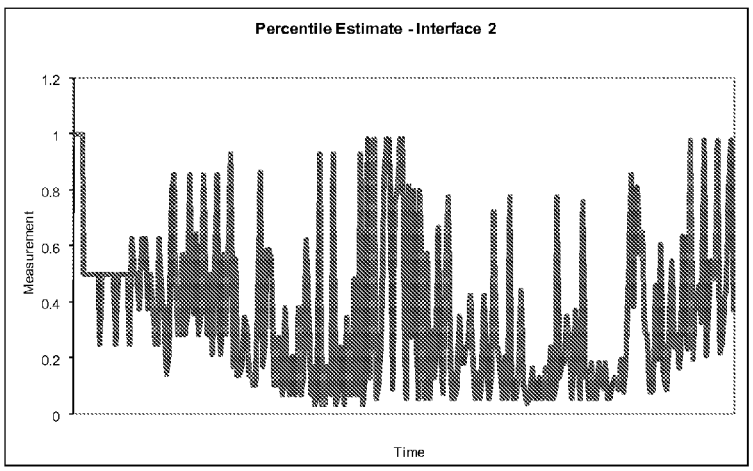
FIG. 12 demonstrates how the disclosed process may display the a percentile estimate of anomalous activity over a period of time based on the activity noted in FIG. 11.
Figure 13:
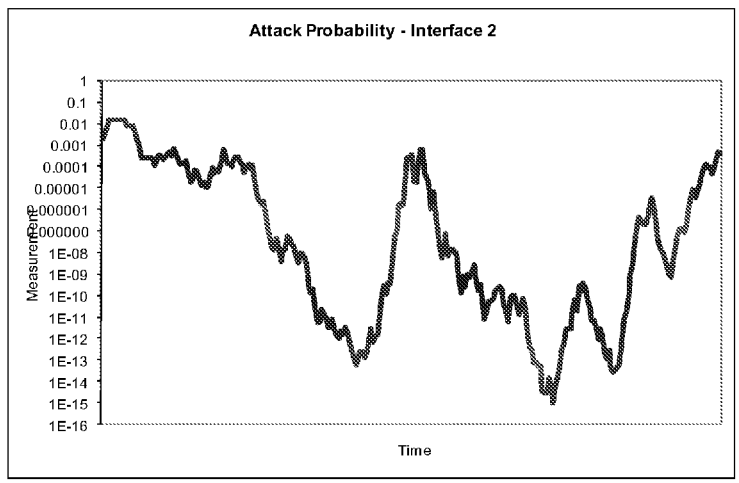
FIG. 13 displays how the anomaly detection process may display the probability of an attack on the network over a period of time based on the activity noted in FIG. 11.
Figure 14:
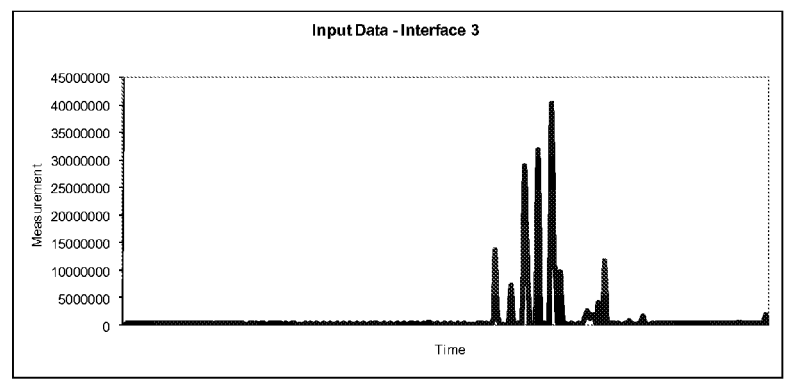
FIG. 14 presents how the disclosed method and system may display the activity of network activity over a period of time.
Figure 15:
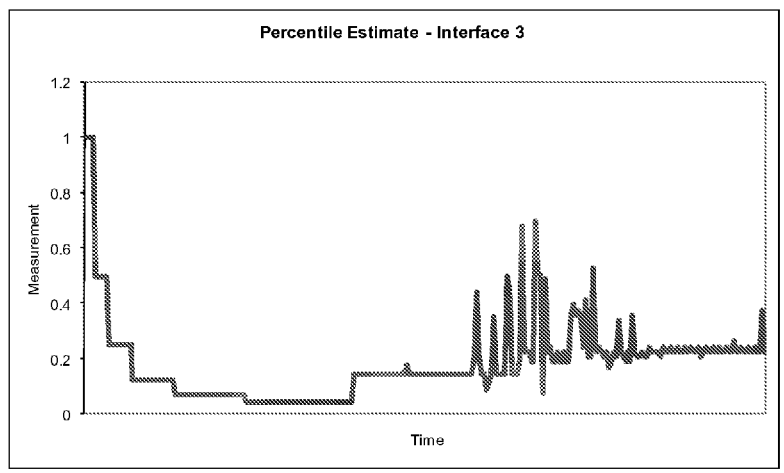
FIG. 15 illustrates an example of how the disclosed method and system may display the a percentile estimate of anomalous activity over a period of time based on the activity noted in FIG. 14.
Figure 16:
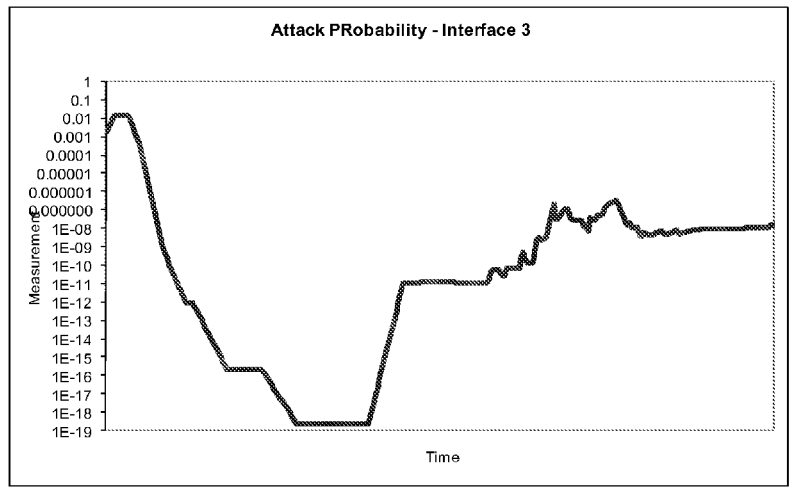
FIG. 16 demonstrates how the anomaly detection process may display the probability of an attack on the network over a period of time based on the activity noted in FIG. 14.
Figure 17:
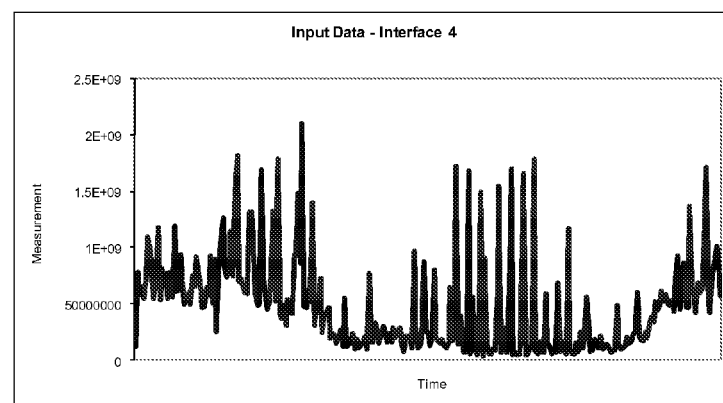
FIG. 17 displays how the disclosed method and system may display the activity of network activity over a period of time.
Figure 18:
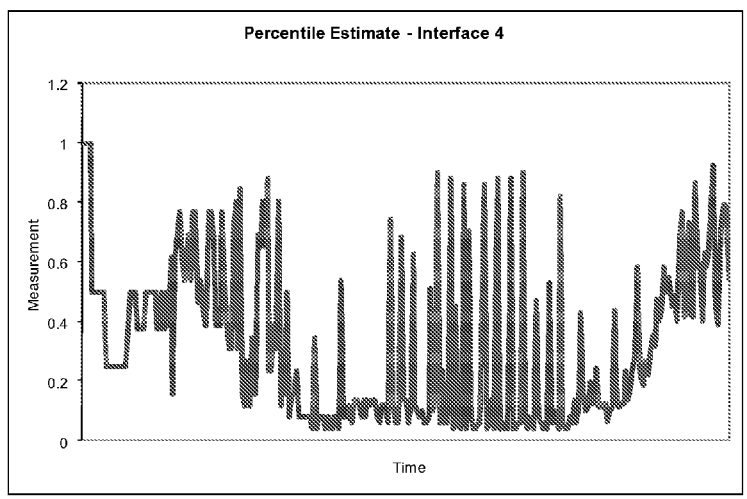
FIG. 18 presents how the anomaly detection process may display the a percentile estimate of anomalous activity over a period of time based on the activity noted in FIG. 17.
Figure 25:
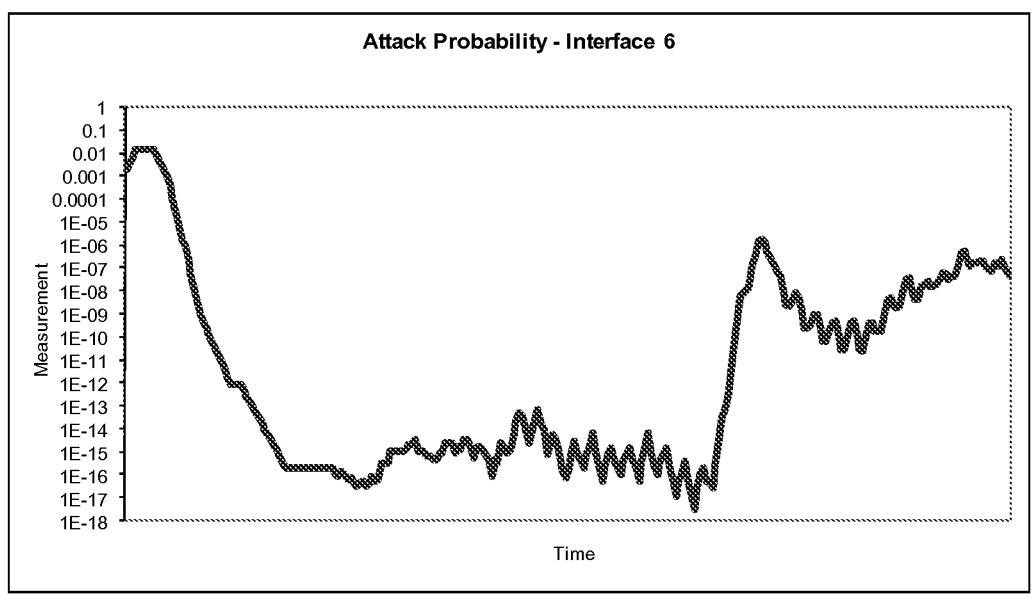
FIG. 25 presents how the disclosed method and system may display the probability of an attack on the network over a period based on the activity noted in FIG. 23.

As shown in FIG. 1, the method has three primary steps: detection 10, analysis 12, and correlation and alerting 14. In detection step 10 occurs nomination step 16 followed by times series generation step 18. Analysis step 12 includes the three functions of optional origin shift step 20, percentiling step 22, and threshold comparison step 24. Then, at correlation and alerting step 14 occurs both correlation step 26 and alerting step 28.

The process begins periodically at predefined time intervals. Each defined detector 10 nominates a set of monitored entities for further analysis. Detectors may execute queries over a variety of network performance metrics, from level of data transmitted to processing time in the network. An example detector would include one that monitors volume from a host. Such a detector could detect a high level of activity originating from a single IP address. If this activity is outside of established parameters, the event is nominated for analysis 16. Where the nomination process evaluates metrics aggregated over time, the analysis process examines individual measurements as a time series. This information then goes to the anomaly discovery section 12. Additionally, an embodiment of the disclosed process may transfer the information to a third component for use by other network tools.

During anomaly detection 12, the disclosed method and system places a measured value in historical context and compares the distribution of an observed stream of values to probability distributions describing normal and abnormal behavior. The likelihood that a series of data points represents an anomaly is calculated using these probability distributions with Bayes' Rule.

This process begins by placing the data point in historical context using a percentile estimation technique. Percentiles are estimated by building a self-adjusting histogram of data points and using it to determine how many historical points fell above and below a given point.

Specifically, a histogram H is defined as a set of categories $C_1 \ldots C_n$. Each Category contains four data items: a lower bound $B_L$, an upper bound $B_U$, the count T of examined items that fell within the upper and lower bound, and the average A of these items. Notationally, data items within categories will be referred to with the category in parentheses. For example, let $T(C_1)$ denote the count of items within category $C_1$.

This histogram is built by beginning with two categories: one from the minimum possible value to the expected average, and one from the expected average to the maximum possible value. If a reasonable estimate of the expected average is not available, any number will do. A good estimate of the expected average value simply allows the algorithm to provide better estimates earlier.

As a data point X arrives, its category C is determined, the corresponding count T(C) is incremented, and the average recalculated as $$A(C) = \frac{(T(C) * A(C)) + X}{T(C) + 1}$$

When the ratio of the count in one category over the total number of items in the histogram ($T(C)/\Sigma_{C \in Categories} T(C)$) exceeds a threshold, which is (1/maximum number of buckets) in the current embodiment, the category is split into two new categories, one ranging from the current minimum $B_L(C)$ to the average A(C) and one ranging from the average A(C) to the current maximum $B_U(C)$. The count T(C) in the current category is divided evenly across the two new categories, and the averages are estimated as (¼ * A(C)) and (¾ * A(C)), respectively.

If the maximum number of categories would be exceeded after a split, it is necessary to recombine two of the existing categories before doing the split, if that recombination results in a more even distribution. If not, the split is postponed. This is done by finding the two contiguous categories with the lowest sum of their counts.

The percentile of a given data point X, then, may be estimated as the ratio of the counts in all categories with upper bounds below X to the total number of items in all categories plus a proportionate percentage of the count of items in the category that X falls into:

$$Percentile(X) = \frac{\sum_{C \in Categories | B_U(C) < X} T(C) + \left(T(C_X) * \frac{X - B_L(C_X)}{B_U(C_X) - B_L(C_X)}\right)}{\sum_{C \in Categories} T(C)},$$

where $C_x$ is the category whose upper bound is greater than X and whose lower bound is less than X.

The value of the nth percentile of a dataset may be estimated as follows. Let p be (n/100) * $\Sigma_{C \in Categories} T(C)$. This is the position of the nth percentile in an ordered list of all data points. Next, find the category that contains this data point by summing the counts of items within each category starting at the first until this sum plus the count in the next category exceeds n percent of the total count. Let i denote the index of the last summed category and let q denote the sum of the counts T(C) in each category up to and including category i. It is known that all data points in or preceding category i are less than the nth percentile. The nth percentile, then, is somewhere between the upper and lower bounds of category i+1. We estimate it, then, as $$nthPercentile(Categories) = B_L(C_i) + \left((B_U(C_i) - B_L(C_i)) * \frac{p - q}{T(C_{i+1})}\right)$$

Probability mass functions may then be authored in terms of percentiles or some function thereof. In one exemplary embodiment, the percentile itself is used unmodified. In another, the ratio of the actual metric value to the 90th or 50th percentile is used. In either case, use of percentiles allows for the authoring of probability mass functions that are normalized with respect to the range of a particular metric or monitored entity and thus apply across all of them. Such probability mass functions may be used in conjunction with Bayes' Rule to derive a continuously updated probability of whether an observed sequence of data points represents an anomaly.

$$Pr(\text{Anomaly}|\text{Point}) = \frac{Pr(\text{Point}|\text{Anomaly}) * Pr(\text{Anomaly})}{Pr(\text{Point})}$$

Rewriting the bottom, $$Pr(\text{Anomaly}|\text{Point}) = \frac{Pr(\text{Point}|\text{Anomaly}) * Pr(\text{Anomaly})}{Pr(\text{Point}|\sim\text{Anomaly}) * Pr(\sim\text{Anomaly}) + Pr(\text{Point}|\text{Anomaly}) * Pr(\text{Anomaly})}$$

Pr(point|anomaly) is given by the first probability mass function. Pr(point|~anomaly) is given by the second. Pr(anomaly) is the prior probability.

The prior probability of an anomaly, Pr(Anomaly), begins as a parameter that represents the likelihood of an anomaly at any given moment. This may be adjusted to reflect changing levels of threat either generally or specifically as to how the threat relates to a predetermined domain pattern. For example, the prior probability for a pattern based on access violations would be higher than the prior probability for a pattern that looks for surges in network flows. As a second example, if the user knows of a widespread worm set to go off today, Pr (Anomaly) might be set to 0.9. On an ordinary day, this may be more like 0.001. The probability of not being under anomaly at any given minute, then, is just the complement: Pr (~Anomaly)=1−Pr(Anomaly).

As each new data point is observed, the prior probability of an anomaly is set to the previous output of the formula. This results in a continually updated estimate of the probability of an anomaly, given all observed data points.

$$Pr(\text{Anomaly}|\text{PreviousPoints, Point}) = \frac{Pr(\text{Point}|\text{Anomaly}) * Pr(\text{Anomaly}|\text{PreviousPoints})}{Pr(\text{Point})}$$

After observing long periods of network activity, such an estimate will respond somewhat slowly to an actual anomaly because the prior probability of an anomaly will have been driven extremely low by long periods of normal activity. We may improve this responsiveness by observing activity over a finite window of time. This may be accomplished by storing the last n anomaly probability estimates. As each new data point comes in, the contribution of the oldest is divided out of the prior probability. The current implementation uses two windows and may look at either window or an algebraic combination of them.

Another positive of the use of Bayes' rule is that it generates a value that is individually understandable by the observer. There is no need to process the value through other programs or compare the value to other values. With a single value, the observer understands the issue in context. A similar value may be generated by other means.

Once the updated probability of anomaly has been calculated, it is compared to a threshold that is a function of the the pattern being analyzed and the user's risk tolerance. If the probability is above the threshold, and several other quality metrics are met, an anomaly is created. The use of this approach, along with the flexibility of the probability mass functions described earlier allows the system to only signal anomalies that are actionable.

Other aspects of the disclosed method and system come from how the disclosed process detects anomalies. As previously mentioned, the anomaly detection process looks for events outside a changing set of parameters, whereas a typical anomaly detector looks for a particular signature. Because other detectors look for signatures, they must receive regular updates to prepare for new threats outside of the defined signatures. The ability to look for an event outside of the predicted norm allows identifying new threats without needing an associated signature.

Unlike many tools that use multiple parameters to detect network anomalies, this disclosed method and system only uses a single parameter, probability—which is driven by a statistical profile. Any input that may be translated into a percentage may be evaluated by the disclosed method and system.

The anomaly detection process also allows for more effective use of other resources. Once the anomaly detection process detects an anomaly the IDS may be directed to look at the anomaly as opposed to waiting for the anomaly to reach/propagate to the IDS. Though described with respect to IP flow, the disclosed process does not have to restrict the scope of observation to IP flow, but may look to databases, other network resources, or any data capable of percentiling (weather, traffic patterns, etc).

As a further example of the effectiveness and uniqueness of the exemplary embodiment consider one network item that leverages Access Control Lists ("ACL"). An ACL is a list of permissions. When a resource wants to perform a particular function, the resource and the function must be on the ACL or the resource will not be allowed to perform the function. For example, if Joe (the resource) wanted to send a file to a server(the function), Joe would have to be in the ACL as being allowed to send network packets to that server. If Joe were attempting a function that was not on the ACL, Joe's connection would be terminated. The anomaly detection process may determine if there are a high number of terminated connections to evaluate if they are anomalous. While this information may be found via firewall records, such information is difficult to obtain and may generate a large number of false positives by listing each termination as a separate alarm. The disclosed process would only send an alert when there was an anomaly, thereby reducing the number of alerts and the number of false positives.

Another feature in an exemplary embodiment of the disclosed process is origin shifting. This process may be applied to the metric prior to percentiling. Typical network activity varies as a function of time. A network might have more activity during business hours than after business hours, and more activity during the workweek opposed to the weekends. A single fixed threshold for the entire time, or even multiple thresholds that activate at predetermined times, does not account for a narrow tailoring of changes. Some methods of determining the threshold could automatically recalibrate at regular intervals, but that involves considerable expenditure of network resources. The disclosed process observes the overall trend of network activity and adjusts the threshold based on an algorithm. This approach has several benefits, including dealing with network metrics that are typically cyclic, and preventing attackers from timing their attacks to minimize detection. This feature is optional for the effective use for the disclosed method and system.

Once the anomaly is discovered, correlation and alerting steps 14 occur. The anomaly detection process looks at the behavior to determine if the observations share characteristics with characteristics common to many network problems 26 If there appears to be a problem, the user is alerted 28.

Correlation also allows the aggregation of associated anomalies to be detected. An individual anomaly might not be sufficient to trigger an alert, but several relatively minor anomalies when taken together could indicate a more serious problem. For example, a minor fan out incident might not warrant an alarm or an ACL violation might not rise to attack level, but when combined, they could indicate an attack or other problem.

The anomaly detection process does not need to work in isolation. The disclosed method and system may communicate with other detection methods and devices to become more effective. The disclosed process may take specific information about other detectors and create a customized output to use more effectively the detectors.

The exemplary embodiment shows various ways the anomaly detection process may illustrate the status of the network to the user. FIG. 3 shows the results for one of the detectors, when run over 5 hours of network data (summarized at one-minute granularity). FIG. 3 also shows a raw metric, the percentiles estimated by the framework, along with the two-windowed anomaly probabilities.

FIG. 4 shows the results of the IP FanOut detector, highlighting the ability of the system to react quickly to anomalous changes while not signaling false positives.

FIGS. 5 through 25 show individual screens of how preliminary results were gathered from one day of one-minute data for seven interfaces. Since only one day was available, percentiles were estimated according to the rest of the day, rather than the same hour on previous days. This leads to increased attack probability estimates during busy hours that would likely not otherwise be the case.

The displays may also use a radar plot to represent network accessibility. In one embodiment, the display would represent network accessibility using a representation that would take the form of a tunnel. The wider the tunnel, the more traffic the network could handle. The display could start with a clear screen. As more restrictions occur due to network usage and anomalies, the clear space would become more constricted. This provides an intuitive interface for displaying graphically how much traffic the network may handle and/or how many anomalies (and their severity) are occurring. To aid in visualization, the certainty of an anomaly may be color-coded. For example, a high probability of an anomaly could be displayed as red. The displays may represent time, detector, host, or any other form of identifier.

All references, including publications, patent applications, and patents, cited herein are hereby incorporated by reference to the same extent as if each reference were individually and specifically indicated to be incorporated by reference and were set forth in its entirety herein.

The disclosed subject matter may be described in the general context of computer-executable instructions, such as program modules, being executed by a computer. Generally, program modules include routines, programs, objects, components, data structures, etc. that performs particular tasks or implement particular abstract data types. The disclosed subject matter may also be practiced in distributed computing environments wherein tasks are performed by remote processing devices that are linked through a communications network. In a distributed computing environment, program modules may be located in local and/or remote computer storage media including memory storage devices.

The detailed description set forth below in connection with the appended drawings is intended as a description of exemplary embodiments in which the presently disclosed process may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

Although the present anomaly detection process has been described in detail herein with reference to the illustrative embodiments, it should be understood that the description is by way of example only and is not to be construed in a limiting sense. It is to be further understood, therefore, that numerous changes in the details of the embodiments of this disclosed process and additional embodiments of this anomaly detection process will be apparent to, and may be made by, persons of ordinary skill in the art having reference to this description. It is contemplated that all such changes and additional embodiments are within the spirit and true scope of this disclosed method and system as claimed below.

What is claimed is:

1. A method for determining an Internet protocol (IP) network status comprising the steps of:
monitoring an IP communications network, said IP communications network comprising a plurality of associated computer systems, said monitoring step further comprising the steps of:
evaluating logged data communicated on said IP communications network as said logged data is logged; and
detecting at least one data communications event from said logged data to be a potentially anomalous event by nominating said at least one data communications event and performing a time series generation associated with the communication of said at least one data communications event on said IP communications network;
discovering said potentially anomalous data event to be an anomalous event by forming a percentiled data set from said logged data and comparing said at least one data communications event to a threshold level associated with said percentiled data set;
estimating and prioritizing said potentially anomalous network activity based on the probability of said potentially anomalous event comprising an anomalous event; and
generating an alert signal in association with said monitoring step if said anomalous event differs from said percentiled data set by a level at least equal to said threshold level.

2. The method of claim 1, further comprising the step of establishing a level of severity associated with the level by which said anomalous event varies from said threshold level.

3. The method of claim 1, further comprising the step of transmitting said alert signal to at least one user of said IP communications network for alerting said at least one user to said potentially anomalous activity.

4. The method of claim 1, further comprising the step of updating a set of previously generated statistics profile of said logged data for relating to said anomalous event.

5. The method of claim 1 where said discovery step further comprises the step of comparing said at least one data communications event to a predicted network event for generating a profile of observed IP communications network activity.

6. The method claim 5 for estimating percentage level of said potentially anomalous network activity comprising the steps of:
   recording a predefined number of memory locations on a communications system for recording anomalous network status in said profile;
   dividing the number of memory locations into discreet groups;
   defining these discreet groups as percentage levels; and
   inserting said comparison in appropriate memory locations for a predetermined amount of time.

7. The method claim 6 where said statistic based profile estimates said predicted network activity based as a function of weighted averages.

8. The method claim 6 where said statistic based profile estimates said predicted network activity based as a function of Bayesian algorithms.

9. The method claim 1 comprising the additional step of coordinating with other network monitoring methods to analyze the anomaly upon anomaly detection.

10. A system for determining an Internet protocol (IP) network status, comprising:
   a computer system comprising a non-transitory computer-readable medium, said non-transitory computer-readable medium further comprising:
       a set of instructions and associated circuitry for monitoring an IP communications network, said IP communications network comprising a plurality of associated computer systems, said monitoring instructions further comprising:
       a set of instructions and associated circuitry for evaluating logged data communicated on said IP communications network as said logged data is logged; and
       a set of instructions and associated circuitry for detecting at least one data communications event from said logged data to be a potentially anomalous event by nominating said at least one data communications event and performing a time series generation associated with the communication of said at least one data communications event on said IP communications network;
       a set of instructions and associated circuitry for discovering said potentially anomalous data event to be an anomalous event by forming a percentiled data set from said logged data and comparing said at least one data communications event to a threshold level associated with said percentiled data set;
       a set of instructions and associated circuitry for estimating and prioritizing said potentially anomalous network activity based on the probability of said potentially anomalous event comprising an anomalous event; and
   said computer system further comprising a set of instructions and associated circuitry for generating an alert signal in association with said monitoring step if said anomalous event differs from said percentiled data set by a level at least equal to said threshold level.

11. The system of claim 10, where said computer readable medium further comprises a set of instructions and associated circuitry for said analyzing potentially anomalous network activity involves comparison of predicted network activity versus observed network activity 12. The system of claim 11, where said computer readable medium further comprises a set of instructions and associated circuitry for generating a value recorded for an observed period.

13. The system of claim 12, where said computer readable medium further comprises a set of instructions and associated circuitry for generating statistics based profile records of said comparison.

14. The system of claim 10, where said computer readable medium further comprises:
   a set of instructions and associated circuitry for recording an anomalous network status in said profile a predefined number of memory locations;
   a set of instructions and associated circuitry for dividing the number of memory locations into discreet groups;
   a set of instructions and associated circuitry for defining these discreet groups as percentage levels; and
   a set of instructions and associated circuitry for inserting said comparison in appropriate memory locations for a predetermined amount of time.

15. The system of claim 14, where said computer readable medium further comprises a set of instructions and associated circuitry for generating at least one statistics based profile estimate of said predicted network activity associated with a function of weighted averages.

16. The system of claim 14, where said computer readable medium further comprises a set of instructions and associated circuitry for generating at least one statistics based profile estimate of said predicted network activity based as a function of Bayesian algorithms.

17. The system of claim 14, where said computer readable medium further comprises a set of instructions and associated circuitry for coordinating with other network monitoring methods to analyze the anomaly upon anomaly detection.

18. A non-transitory computer readable medium, comprising:
   a set of instructions and associated circuitry for monitoring an IP communications network, said IP communications network comprising a plurality of associated computer systems, said monitoring instructions further comprising:
       a set of instructions and associated circuitry for evaluating logged data communicated on said IP communications network as said logged data is logged;
       a set of instructions and associated circuitry for detecting at least one data communications event from said logged data to be a potentially anomalous event by nominating said at least one data communications event and performing a time series generation associated with the communication of said at least one data communications event on said IP communications network;
       a set of instructions and associated circuitry for discovering said potentially anomalous data event to be an anomalous event by forming a percentiled data set from said logged data and comparing said at least one data communications event to a threshold level associated with said percentiled data set;
       a set of instructions and associated circuitry for estimating and prioritizing said potentially anomalous network activity based on the probability of said potentially anomalous event comprising an anomalous event; and
   said computer-readable memory further comprising a set of instructions and associated circuitry for generating an alert signal in association with said monitoring step if said anomalous event differs from said percentiled data set by a level at least equal to said threshold level.

19. The computer readable medium of claim 18 wherein said set of instructions and associated circuitry for analyzing potentially anomalous network activity further comprises a set of instructions and associated circuitry for comparison of predicted network activity versus observed network activity.

* * * * *

UNITED STATES PATENT AND TRADEMARK OFFICE
CERTIFICATE OF CORRECTION

| | |
|---|---|
| PATENT NO. | : 8,601,575 B2 |
| APPLICATION NO. | : 12/059076 |
| DATED | : December 3, 2013 |
| INVENTOR(S) | : Peter Mullarkey et al. |

It is certified that error appears in the above-identified patent and that said Letters Patent is hereby corrected as shown below:

On the Title Page, item [60] Related U.S. Application Data: Please correct the priority application number by deleting "60/903,307" and replacing with --"60/909,307"--

Signed and Sealed this
Twenty-ninth Day of April, 2014

Michelle K. Lee
*Deputy Director of the United States Patent and Trademark Office*